United States Patent [19]

Voorhees

[11] 4,138,759
[45] Feb. 13, 1979

[54] DUAL BLADE WIPER

[76] Inventor: John Voorhees, Box 476, Gravette, Ark. 72736

[21] Appl. No.: 855,383

[22] Filed: Nov. 28, 1977

[51] Int. Cl.$^2$ .............................................. B60S 1/38
[52] U.S. Cl. ................................. 15/245; 15/250.36; 15/250.41
[58] Field of Search ........... 15/250.36, 250.40, 250.41, 15/245

[56] References Cited

U.S. PATENT DOCUMENTS

| 1,659,496 | 2/1928 | Oishei et al. | 15/250.4 X |
| 1,978,192 | 10/1934 | Freud | 15/250.41 |
| 2,587,382 | 2/1952 | Pyne | 15/245 |
| 2,611,146 | 9/1952 | Buckley | 15/245 X |
| 3,089,173 | 5/1963 | Hunt | 15/245 |

FOREIGN PATENT DOCUMENTS 1271508 8/1961 France .................. 15/250.41

Primary Examiner—Peter Feldman
Attorney, Agent, or Firm—Robert R. Keegan

[57] ABSTRACT

There is disclosed a dual blade wiper for a windshield wiper or squeegee in which the wiper is separated along its length into two blade portions except for its ends; at the ends the blade is not separated but at least one of the ends has a slot which communicates with the space between the 2 blade portions; the blade edges are preferably rounded on the ends rather than having the conventional tapered configuration. The construction of the blade, the flexure characteristics of the material and the forces present during motion of the wiper cause the blade portions to separate and come together in the reciprocating action of the windshield wiper, thereby drawing water or moisture into the space between the blade portions and ejecting it from the slot communicating with the space between the blade portions.

10 Claims, 4 Drawing Figures

DUAL BLADE WIPER

The present invention relates to blades for removing moisture from smooth surfaces such as glass and in particular to windshield blades and squeegees. While the conventional wiper (which term shall be deemed hereinafter to also include squeegees) may take numerous specific configurations, it is generally a blade of flexible material which is tapered to a nearly knife-like edge. It is intended to be supported by one or more brackets at its thick edge and manipulated so that the thin edge of the blade moves across the glass or other smooth surface in a direction transverse to the longitudinal axis of the blade.

The action of a conventional blade is such that the thin edge of the blade is maintained in close contact with the glass due to the manner in which the bracket and its supporting arm are arranged. There is almost always significant resilience for the support structure for the arm and/or the brackets. Assuming that the thin edge of the blade is maintained in close contact with the glass, its action is to physically sweep the moisture or water droplets from the area across which it reciprocates. (There are also wiper blades which rotate in a continuous motion rather than reciprocating.) The maximum permissible pressure with which the thin blade edge can contact the glass is determined in part by the flexibility of the blade. Since it is desired that the blade be rather flexible, particularly when it is used on curved glass such as automobile windshields, the pressure on the blade is rather severely limited. As a consequence, the travel of the blade leaves behind a significant film of water or moisture on the glass which is generally tolerated as unavoidable.

The dual blade wiper according to the present invention in addition to sweeping the water from the surface also operates in a distinctly different manner to produce a vacuum effect which further removes the moisture film on the glass and causes it to be ejected from one or both ends of the wiper. This action is produced by the dual blades which separate and join in the reciprocating motion of the wiper to produce a vacuum pumping action.

The blade according to the present invention also differs in that the edge against the glass is not the thinnest portion of the blade, but is rather of slightly enlarged dimension and rounded. This shape is permissible because the wiper does not rely solely on sweeping action, and the rounded enlarged edge of the blades has the advantage of greatly increasing the normal life of the blade through reduction of wear at the point of contact with the windshield or other smooth surface. The wiper is suitable for reciprocating windshield wipers and also for squeegees and other wiper-type configurations. It is not advantageous for any surface wiping application in which the wiping motion is uni-directional.

The vacuum effect produced by the separation of the two blade portions is also desirable in that it tends to increase the force tending to press the wiper against the smooth surface. The extent of the contribution of this effect is not quantitatively known, but it is believed that it is significant.

In addition to providing the features and advantages described above, it is an object of the present invention to provide a dual bladed wiper or squeegee with provision for a vacuum-producing flexure effect which enhances the efficiency of the wiper.

It is another object of the present invention to provide a dual blade wiper or squeegee with the 2 blades joined together at the ends thereof except for a slit communicating with the space between blades thereby creating a mechanism for a pumping effect to eject moisture from the ends of the wiper.

It is a still further object of the present invention to provide a dual blade wiper or squeegee in which the edges of the blades in contact with the glass or other smooth surface are rounded and of slightly greater thickness than the immediately adjacent portion of the blade.

In addition to the above objects and advantages of the invention, other objects will be apparent from a consideration of the following description in conjunction with the appended drawings in which.

Figure 1:
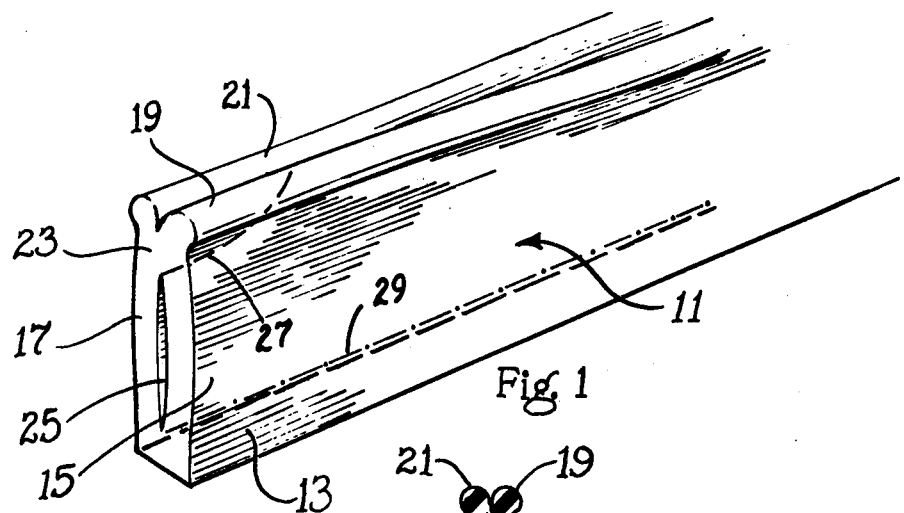
FIG. 1 is an enlarged, fragmentary isometric view of a dual blade wiper according to the present invention.

Referring now to the drawings and particularly to FIG. 1 a wiper 11 is shown formed of molded or extruded elastomeric material such as butyl rubber, natural rubber, polybutadiene, styrene butadiene resins, chloroprene resins or other synthetic or natural elastomers or combinations thereof. The wiper 11 is shown molded in one piece as a preferred embodiment, but it could be molded in two pieces and secured together by adhesive or otherwise.

It will be understood that the wiper 11 will be made to fit in the brackets of an automobile windshield wiper in conventional fashion and will in general be a replacement for a conventional windshield wiper blade.

The wiper 11 consists of a base or stem portion 13 and two blades 15 and 17. Each of the blades 15 and 17 has a rounded edge portion 19 and 21 respectively which contacts the glass or other smooth surface being wiped with the wiper. This contrasts with the conventional wiper which has a single blade which is tapered to a nearly knife-like edge.

The rounded edges 19 and 21 are advantageous in that they better distribute the wear of the blade by its motion against the glass or other surface and thus enhance the longevity of the wiper.

The blades 15 and 17 are separated for most of their length and for the greater portion of their height; their joindure or junction where they merge into the stem 13 is indicated by dot dash line 29. The top end portions of the blades 15 and 17 are also joined, and this junction line is indicated by dot dash line 27. Thus while the blades 15 and 17 are free to separate along the central portion of their length, they are held together and restrained from separating by a junction portion 23 the lower boundary of which is indicated by dot dash line 27. While portion 23 is shown as one unitary body, it may be convenient to create the junction portion 23 by fusing or adhesively joining the blades 15 and 17 at their ends.

A slot 25 is left which communicates with the space between blades 15 and 17 and provides an avenue for expelled water or moisture when the blades collapse together at the end of a reciprocating wiper stroke. The slot or slit 25 (which may be about ¼ inch long) is shown in a somewhat open position as it would be when water, air or moisture was being expelled during the collapse of the space between blades 15 and 17. However, when not exposed to pressure from the fluid between the blades, the slot 25 would be closed; in particular when the blades were being separated by the action of the wiper to produce a vacuum in the space between the blades, the slit 25 would become even more tightly closed due to the pressure on the sides of the blades 15 and 17 adjacent the slit 25.

Figure 2:
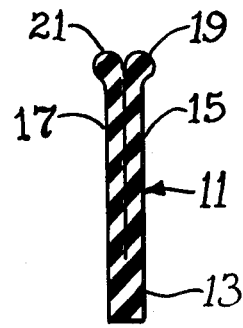
FIG. 2 is a cross-sectional view of a wiper of the type illustrated in FIG. 1 but showing the static position of the blades of the wiper.

FIG. 2 shows the undistorted shape of the wiper in which blades 15 and 17 are in contact throughout their length in contrast to the shape under distorting stresses as indicated in FIG. 1.

The position shown in FIG. 2 is also the ideal position for the blades at the point in the wiper motion where there is a reversal of direction. In practice, of course, there may be distortion of the blades to some degree during the reversal of motion. However, an important feature of the invention is the collapse or partial collapse of the blades together at the reversal of motion to force the water and moisture collected between the blades out the slot 25 at one or both ends of the wiper.

As the wiper enters the phase of continuous motion, the blades will be separated due to the forces acting on the edges of the blades 19 and 21 and aided by the shape of such blade ends. The wiper is particularly adapted for use on the curved windshields of automobiles but is also useful on flat surfaces as well. As previously discussed, the dual blade wiper operates on a moisture vacuum principle. As the blade moves on either an upward or return arc, the leading blade edge will sweep away most of the water and moisture in the fashion of a conventional wiper blade; at the same time, the trailing blade edge will be stretched and extended and in the process will create a slight vacuum between the two blade surfaces. This vacuum will eliminate residual moisture and greatly improve the performance of the windshield wiper. As the blade starts on the return stroke and the blade surfaces exchange relationships, the blades will first collapse together forcing any liquid or moisture trapped between the blades out the slits 25 on one or both ends of the wiper. Then the blades will tend to separate again with their trailing and leading roles reversed.

Figure 3:
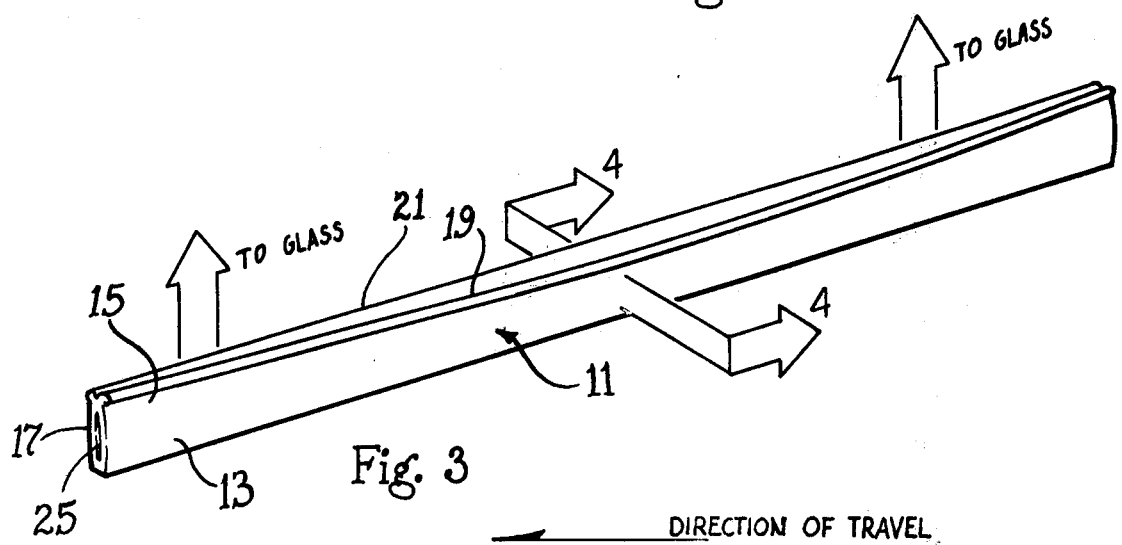
FIG. 3 is an isometric view of the entire wiper shown fragmentarily in FIG. 1 and also illustrating the dynamic or distorted shape of the wiper as in operation.
Figure 4:
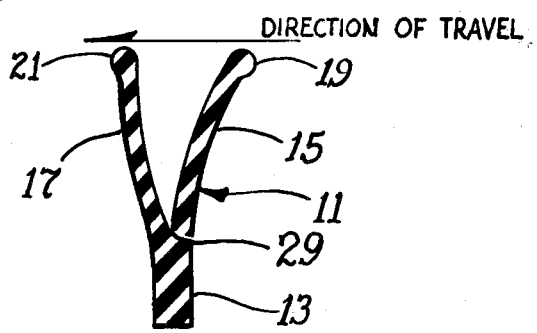
FIG. 4 is a cross-sectional view of the wiper of FIG. 3 taken at a plane indicated by the arrow 4—4 in FIG. 3.

FIG. 3 shows the entire wiper blade indicating its position relative to the windshield or other glass being wiped and represents a position of the blades as would be assumed near the end of a stroke. FIG. 4 is a cross-section along the arrow 4—4 in FIG. 3, and the arrow and legend in FIG. 4 indicates the direction of travel of the wiper.

The wiper according to the invention will, of course, be dimensioned to suit the particular circumstances, especially in those cases where it is a replacement for a conventional blade. Typical dimensions for the blade might be about 12 inches long, ⅜ inch thick at the stem and at the top across the edges 19 and 21, and about ¾ inch in total height including the stem 13 and the blades 15 and 17.

The above dimensions, of course, are in no way limiting, and the actual dimensions will be selected to suit the particular application that is involved. Other variations may be made within the scope of the invention. For example, it may be desired that the normal un-stressed position of the blades be separated somewhat as indicated in FIG. 4 and FIG. 3 and that the forces acting on the blade at the point of reversal be relied upon to collapse the blades to the configuration shown in FIG. 2. Also the particular location of the exit slits 25 is subject to variation, and in addition to being on one or both ends of the wiper could also be on the back of the stem 13. While the blades 15 and 17 have been shown to be of the same length and configuration, in special applications one of the blades could be made shorter, thinner or otherwise different from the other. While two blades are shown, the wiper could include three or more blades; with three blades the flexibility of the outside two blades may be greater or otherwise different from the center blade.

Other variations and modifications of the invention in addition to those described or suggested above will be apparent to those skilled in the art and accordingly the scope of the invention is not to be deemed to be limited to the specific embodiments illustrated or suggested but is rather to be determined by reference to the appended claims.

What is claimed is:

1. In a window glass wiper apparatus or the like,
    a wiper element of elastomeric material having an elongated shape with a first long side being adapted to be held against a smooth surface and moved transverse to its longitudinal axis and a second long side adapted to be gripped in a wiper mechanism,
    said wiper element having at least two blades separable at their edges along at least some of the length but less than all of the length of said first long side, said blades being joined along substantially all the length of said second long side, the two blades when separated and held against said smooth surface being capable of forming an enclosed space therebetween, said space having a variable volume dependent on the separation of said blades, said blades including means at each end for at least partially joining said blades to form said enclosed space, and
    at least one opening through said wiper element into said enclosed space.

2. Apparatus as claimed in claim 1 wherein at least one of said blades has a cross-section transverse to its longitudinal axis which is rounded and enlarged at the end along said first long side of said wiper element.

3. Apparatus as claimed in claim 1 wherein said opening is located in the means for joining said blades at each end of said wiper element.

4. Apparatus as claimed in claim 1 wherein said opening is a slit in said elastomeric material.

5. Apparatus as claimed in claim 1 wherein said blades are of similar cross-section and the cross-section of said wiper element is symmetric relative to the junction line between said blades.

6. Apparatus as claimed in claim 1 wherein said wiper element is formed of one unitary body of material.

7. In a reciprocable window glass wiper apparatus or the like,
    a wiper element of flexible elastomeric material having an elongated shape with a first long side being adapted to be pressed against a smooth surface and moved with a reciprocating motion transverse to its longitudinal axis for the purpose of removing moisture from a portion of said surface and having a second long side adapted to be gripped in a wiper mechanism, said wiper element having at least two blades separable at their edges along most of but less than all of the length of said first long side, said blades being joined along substantially all the length of said second long side, the two blades when separated and pressed against said smooth surface being capable of forming an enclosed space therebetween having a maximum volume which is significant in relation to the volume of the material of said blades, said space having a variable volume dependent on the separation of said blades, said blades including means at each end for at least partially joining said blades to form said enclosed space, and at least one opening through said wiper element into said enclosed space which is formed so as to more readily permit egress of fluid from said space than to permit ingress of fluid into said space, and said blades being capable of being flexed by forces imparted between said mechanism and said smooth surface to produce substantial variations in the volume of said enclosed space.

8. Apparatus as claimed in claim 7 wherein at least one of said blades has a cross-section transverse to its longitudinal axis which is rounded and enlarged at the end along said first long side of said wiper element.

9. Apparatus as claimed in claim 7 wherein said opening is located in the means for joining said blades at each end of said wiper element.

10. Apparatus as claimed in claim 7 wherein said opening is a slit in said elastomeric material.

* * * * *